United States Patent
Hoebel et al.

(10) Patent No.: US 10,695,832 B2
(45) Date of Patent: Jun. 30, 2020

(54) METHOD FOR MANUFACTURING A MECHANICAL COMPONENT

(71) Applicant: ANSALDO ENERGIA IP UK LIMITED, London (GB)

(72) Inventors: Matthias Hoebel, Windisch (CH); Mikhail Pavlov, Dietikon (CH); Thomas Etter, Muhen (CH); Roman Engeli, Zurich (CH)

(73) Assignee: GENERAL ELECTRIC TECHNOLOGY GMBH, Baden (CH)

(*) Notice: Subject to any disclaimer, the term of this patent is extended or adjusted under 35 U.S.C. 154(b) by 294 days.

(21) Appl. No.: 15/727,193

(22) Filed: Oct. 6, 2017

(65) Prior Publication Data

US 2018/0099331 A1    Apr. 12, 2018

(30) Foreign Application Priority Data

Oct. 8, 2016 (EP) .................... 16192963

(51) Int. Cl.
  *B22F 3/00* (2006.01)
  *B22F 3/105* (2006.01)
  (Continued)

(52) U.S. Cl.
  CPC ............ *B22F 3/001* (2013.01); *B22F 3/1055* (2013.01); *B22F 3/24* (2013.01); *B23K 26/342* (2015.10);
  (Continued)

(58) Field of Classification Search
  CPC .............. B22F 3/001; B22F 2003/1057; B22F 2003/248; B22F 2999/00; B22F 3/1055;
  (Continued)

(56) References Cited

U.S. PATENT DOCUMENTS

2014/0263209 A1   9/2014 Burris et al.
2014/0265046 A1   9/2014 Burris et al.
(Continued)

FOREIGN PATENT DOCUMENTS

DE   10 2007 059 865 A1   6/2009
DE   10 2014 222 526 A1   5/2016
(Continued)

OTHER PUBLICATIONS

By Edaboard.com, what is the difference between radiation intensity and power density, publically available Jun. 15, 2012, last accessed Sep. 20, 2019 (Year: 2012).*

(Continued)

*Primary Examiner* — Jessee R Roe
*Assistant Examiner* — Rebecca Janssen
(74) *Attorney, Agent, or Firm* — Armstrong Teasdale LLP

(57) ABSTRACT

A method for manufacturing a mechanical component by additive manufacturing which includes at least one layering sequence of depositing a powder material and locally melting and resolidifying the powder material. In each layering sequence, a solid layer of solidified material is formed, wherein the solid layers jointly form a solid body. An annealing sequence subsequent to at least one layering sequence includes, locally heating at least a region of the solid body in effecting a local heat input to the immediately beforehand manufactured solid layer which was formed by the immediately precedent layering sequence, with temperature being is maintained below a melting temperature of the material.

13 Claims, 3 Drawing Sheets

(51) Int. Cl.
 B22F 3/24 (2006.01)
 B23K 26/342 (2014.01)
 B33Y 10/00 (2015.01)
 B33Y 40/00 (2020.01)

(52) U.S. Cl.
 CPC ............... *B33Y 10/00* (2014.12); *B33Y 40/00* (2014.12); *B22F 2003/1057* (2013.01); *B22F 2003/248* (2013.01); *B22F 2999/00* (2013.01); *Y02P 10/295* (2015.11)

(58) Field of Classification Search
 CPC .......... B22F 3/24; B33Y 40/00; B33Y 10/00; B23K 26/342; Y02P 10/295
 See application file for complete search history.

(56) References Cited

U.S. PATENT DOCUMENTS

| | | |
|---|---|---|
| 2014/0265047 A1 | 9/2014 | Burris et al. |
| 2014/0265048 A1 | 9/2014 | Burris et al. |
| 2014/0265049 A1 | 9/2014 | Burris et al. |
| 2014/0271328 A1* | 9/2014 | Burris .................. B23K 26/034 419/53 |
| 2014/0305368 A1 | 10/2014 | Davis et al. |
| 2015/0064048 A1 | 3/2015 | Bessac et al. |
| 2015/0108695 A1* | 4/2015 | Okada .................. B29C 64/135 264/497 |

FOREIGN PATENT DOCUMENTS

| | | |
|---|---|---|
| EP | 2 565 294 A1 | 3/2013 |
| EP | 2 586 548 A1 | 5/2013 |
| EP | 2 589 449 A1 | 5/2013 |
| EP | 2 737 965 A1 | 6/2014 |
| EP | 2 754 515 A2 | 7/2014 |
| EP | 2 815 841 A1 | 12/2014 |
| EP | 2 865 465 A1 | 4/2015 |
| EP | 2 886 225 A1 | 6/2015 |
| WO | WO 2014/025432 A2 | 2/2014 |

OTHER PUBLICATIONS

European Search Report of European Patent Application No. 16192963.3, dated Apr. 12, 2017.

* cited by examiner

METHOD FOR MANUFACTURING A MECHANICAL COMPONENT

PRIORITY CLAIM

This application claims priority from European Patent Application No. 16192963.3 filed on Oct. 8, 2016, the disclosure of which is incorporated by reference.

TECHNICAL FIELD

The present disclosure relates to a method for manufacturing a mechanical component as set forth in the claims.

BACKGROUND OF THE DISCLOSURE

It has become increasingly common to manufacture mechanical components, such as for instance, but not limited to, turboengine components, from material powders by means of additive manufacturing methods which are similar to rapid prototyping. In applying such methods, no specific tooling for a component is required. Generally, said methods are based upon depositing a material powder, for instance a metal powder, and melting and resolidifying the powder at selected locations such as to form a component with a specific geometry from the resolidified material. As is apparent, these methods allow for a great flexibility of the geometry of the component to be manufactured, and allow for instance undercuts, manufacturing almost closed cavities, and the like. In particular, the powder is deposited layer by layer, each layer measuring for instance in the range of some tenths of a millimeter. The melting step is performed such as to locally melt the powder and the surface of a solidified solid volume beneath, such that the newly molten material is, after resolidification, substance bonded to an already manufactured solid volume. Such methods are for instance known as Selective Laser Melting (SLM) or Electron Beam Melting (EBM), while not being limited to these methods.

Mechanical components manufactured by a method of the above-mentioned kind exhibit largely different microstructures compared to conventionally cast or wrought components made from the same alloy. For instance, when compared to cast or wrought components, the grain structure is significantly finer, due to the high cooling rate which is present during, for instance, SLM or EBM processing. Moreover, when applying additive manufacturing from nickel or gamma prime forming cobalt based superalloys, the high cooling rates also cause a gamma prime or γ' free microstructure after the additive manufacturing process. With respect to cobalt based alloys, cobalt based superalloys in which, according to current knowledge, tungsten and/or aluminum are contained as alloying elements have growingly become of practical interest and have shown to form gamma/gamma prime microstructure. When an accordingly manufactured article from such superalloys is heated up the first time to sufficiently high temperatures, the gamma prime phase starts to precipitate. It is in particular the gamma prime phase which causes the superior material properties with respect to elevated temperature strength and resistance to creep deformation. The gamma prime phase however exhibits a comparatively lower ductility when compared to the gamma phase. For instance, different thermal expansion within a component may result in high local stress intensities.

In order to achieve the named superior material properties at elevated temperatures, the component manufactured by additive methods commonly undergoes a heat treatment step in order to precipitate the gamma prime phase. During gamma prime precipitation the lattice parameter changes. That is, the volume occupied by a lattice changes when fractions of the gamma phase, γ, transform to the gamma prime phase, γ'. This dimensional change causes stresses in the component. For instance, it is observed that the lattice parameter of the gamma prime phase is in most instances smaller than the lattice parameter of the gamma phase. Thus, volume fractions of a component containing gamma prime precipitates shrink during a heating up process, whereas other volume sections expand. The lattice mismatch between gamma prime and surrounding gamma may result in significant stresses, which are further amplified by the low ductility of the gamma prime phase and are adding to residual stresses from manufacturing and stresses due to temperature gradients during heating up of the component. Said combined stresses may result in crack initiation when heating up the component for the first time, also referred to strain age cracking, or SAC, and related elevated scrap rates.

The teaching of EP 2 754 515 proposes to overcome this issue by adding crack resistant features to the manufacturing component. However, particularly in sharp transition areas or in areas which notch effects, these design changes may not be sufficient to avoid strain age cracking. Moreover, adding to some extent crack resistant features reduces the degree of freedom of design and the benefit of applying the specific manufacturing method.

EP 2 586 548 proposes to use a material wherein the grain size is controlled. EP2 589 449 strives at controlling heat intake into the additively manufactured component during the build process in order to reduce stresses. Other disclosures, such as in EP 2 737 965, EP 2 865 465, and EP 2 886 225, propose tailoring the material properties of the material used to the particular load conditions.

EP 2 815 841 focusses on the post-build heat treatment process.

OUTLINE OF THE SUBJECT MATTER OF THE PRESENT DISCLOSURE

It is an object of the present disclosure to provide a method for manufacturing a mechanical component which comprises building up the component by means of an additive manufacturing method. In one aspect, the method shall reduce the scrap rates from manufacturing, compared to prior art methods. In another aspect, the method shall maintain the full degree of freedom of design. In still other aspects, the method shall allow a maximum freedom of material choice. For instance, the method shall be applicable without restrictions to a selection of materials, with respect to grain size or other properties which may be detrimental to the properties of the build component. In other aspects, the method shall be proposed in such a way that no investment in additional equipment is necessary.

This is achieved by the subject matter described in claim 1.

Further effects and advantages of the disclosed subject matter, whether explicitly mentioned or not, will become apparent by virtue of the disclosure provided below.

Disclosed is a method for manufacturing a mechanical component, wherein the method comprises applying an additive manufacturing method. The method comprises at least one layering sequence of depositing a powder material and locally melting and resolidifying the powder material. In each layering sequence a solid layer of solidified material is formed, wherein the solid layers jointly form a solid body.

It is understood that in each intermediate step a solid body is formed which grows with each layering sequence. The method further comprises executing an annealing sequence subsequent to at least one layering sequence, wherein the annealing sequence comprises locally heating up at least a part of the solid body in effecting local heat input to the immediately beforehand manufactured solid layer which was formed by the immediately precedent layering sequence. The temperature during the annealing sequence is maintained below the melting temperature of the material. In particular, the method is performed such that each successively formed layer is substance-bonded to a precedently formed layer. During the annealing sequence, in situ annealing is performed while the component is built.

It is noted that within the framework of the present disclosure the use of the indefinite article "a" or "an" does in no way stipulate a singularity nor does it exclude the presence of a multitude of the named member or feature. It is thus to be read in the sense of "at least one" or "one or a multitude of".

It is understood that due to the thermal bonding of subsequently formed solid layers significant stresses may result in the solid body after the solid body has reached a uniform temperature. Moreover, the steep material temperature gradients which are inherent to the production method may, impede certain metallurgical phase transitions which would occur for instance when applying a casting method. For instance, some alloys such as e.g. nickel base alloys which are alloyed with aluminum and/or titanium or some cobalt base superalloys form the so-called gamma/gamma prime lattice when dwelling in a certain temperature range for a sufficient time. The precipitation of the gamma prime phase would start at the first heating up of the mechanical component to a certain gamma prime formation threshold temperature and when the course of material temperature over time enters a gamma prime precipitating domain of a Time Temperature Transformation, or TTT, diagram of the specific material. It is appreciated, that in particular mechanical components intended for use in the hot fluid path of a turboengine, and in particular in the combustor or the expansion turbine of a gas turbine engine, will typically be exposed to sufficiently high temperatures for gamma prime precipitation. As noted above, precipitation of a gamma prime phase results in volume changes of the material, and at the same time a reduction of ductility by up to two orders of magnitude, and consequently induces additional stresses in the component. Due to the annealing sequence, depending on the annealing temperature and dwell time for a given material composition, the residual stresses from manufacturing may be at least partly relaxed and/or formation of first gamma prime precipitates may be induced. It is noted that, as the gamma prime precipitation in the described method takes place close to the surface of the intermediately formed solid body, the volume change due to the gamma prime precipitation is significantly less obstructed and thus causes lower stresses than in the center of a body. An intermediately formed or intermediate solid body is in this respect to be understood as a solid body which is formed during the build-up process at any time before the last layering sequence.

In an aspect, the method comprises in particular provided a powder metal as the powder material. The metal may be a superalloy. It may be a nickel or gamma-prime forming cobalt based alloy. It may comprise at least one of aluminum and titanium as alloying element. The metal composition may be such that the material comprises at least 20 vol %, that is, percent by volume, of a gamma prime phase in the fully heat treated condition. The gamma prime phase of Ni-base alloys has the crystallographic structure $L1_2$ with nominal stoichiometric composition of $Ni_3Al$ or $Ni_3(Al,Ti)$, and $Co_3(Al,W)$ for Co-base superalloys. The gamma prime or γ' phase may be described as a primitive cubic lattice of an alloying element, most commonly aluminum and/or titanium, wherein atoms of the base material, commonly nickel of cobalt, are arranged at the face centers of the cube. In another aspect, the gamma prime phase may be described as a cubic face centered lattice, wherein the alloying element atoms, that is in particular atoms of at least one of aluminum and/or titanium, are arranged at the corners, and atoms of the base material, in particular nickel or cobalt, are arranged at the face centers. A fully heat treated condition may in this respect be understood as a condition in which the additively manufactured component was treated at a sufficient dwell time at a sufficiently high temperature to achieve the full, maximally possible, gamma prime precipitation and/or a required material hardness.

Locally melting the powder material may in certain instances comprise exposing the powder material to radiation at a first incident radiation intensity and providing a first incident radiation energy per unit area, and locally heating up at least a part of the solid body comprises exposing the immediately beforehand manufactured solid layer to radiation at a second incident radiation intensity and providing a second incident radiation energy per unit area. Radiation may in this respect comprise at least one of electromagnetic radiation and/or particle radiation, whereby it is understood that in terms of physics both are expressions for the same phenomenon. Radiation may thus for certain instances be light, more in particular light from a laser light source, or electron beam radiation. Any statements made below for light thus also applies to an electron beam, or to radiation in general. Locally melting the powder material may thus in certain instances comprise projecting at least one of a light beam, for instance a laser light beam and/or an electron beam, onto the powder material at a first incident radiation intensity and providing a first incident energy per unit area, and locally heating up at least a part of the solid body may comprise projecting at least one of a light beam and/or an electron beam onto the immediately beforehand manufactured solid layer which was built immediately before at a second incident radiation intensity and providing a second incident energy per unit area. More in particular, the second incident radiation intensity may be smaller than the first incident radiation intensity, and even more in particular may be smaller than the first incident radiation intensity by at least one order of magnitude. In another aspect of the presently disclosed method the second incident energy provided per unit area may be smaller than the first incident energy provided per unit area. In providing a smaller incident light intensity and/or a smaller incident energy per unit area during the annealing sequence, remelting the surface of the solid body may be avoided. Incident intensity may be defined as radiation power, for one instance light power or laser power, per unit area of radiation exposed solid body surface, or incident energy provided per unit area of light exposed solid body surface per time. In terms of a formula, intensity may be expressed as $$I=P/A,$$

wherein I is the radiation intensity, P is the radiation power measured in [W] and A is the projection surface on the component or powder be surface, measured in [$m^2$]. The incident energy provided per unit area of radiation exposed solid body surface, measured in [$J/m^2$], may be defined as the radiation power divided by the beam diameter projected onto the exposed surface and divided by a velocity at which the beam is guided over the surface, also referred to as the scan speed. The radiation power may for instance be an average continuous wave output power of a laser.

The radiation may be provided as a light beam by a light source, and may more in particular be, as implicitly noted above, provided as a laser light beam.

For instance, the typical incident radiation intensity when locally melting the powder material during the layering sequence may be in a range of 5 to 100 kW/mm$^2$, while the typical incident radiation intensity when locally heating up at least a part of the solid body during the annealing sequence may typically be in a range of 0.5-5 kW/mm$^2$. The typical incident energy provided per unit area of solid body surface which is exposed to radiation, when locally melting the powder material during the layering sequence, may be in a range of 0.8-5 J/mm$^2$, while the typical incident energy provided per unit area of radiation when locally heating up at least a part of the solid body during the annealing sequence may typically be in a range of 0.1-0.8 J/mm$^2$. Reducing the incident radiation intensity may comprise defocusing a beam, for instance a laser light beam, by at least 3 to 4 Rayleigh lengths when compared to the layering sequence. A Rayleigh length is the distance from the focal position along the beam propagation direction along which the illuminated area becomes twice as big as in the focal plane. The scan speed during the annealing sequence may be in excess of 1 m/s. The beam diameter on the exposed surface of the solid body may typically be in a range from 0.3-0.7 mm. These values allow using for instance the maximum available laser power of state of the art 400 W SLM machines without the risk of local remelting during the in situ annealing sequence.

In the sense of the foregoing, locally melting the powder material may comprise projecting a beam of radiation of a first power onto a first projection surface on the powder material, and locally heating up at least a part of the solid body comprises projecting a beam of radiation of a second power onto a second projection surface on the immediately beforehand manufactured solid layer, wherein the second projection surface is larger than the first projection surface. The first and second power may be equal or different. In specific embodiments, the same radiation source is used for the layering step and the annealing step. Thus, no additional hardware is required for carrying out the method as herein described. The method can thus be carried out for instance in a standard SLM or EBM equipment. In certain embodiments, the radiation source is operated at the same power during the layering sequence and the annealing sequence. In a further aspect, the radiation source is operated at maximum power during the layering sequence and the annealing sequence. It will be appreciated that in this case the radiation exposed surface during the annealing sequence is larger than during the layering sequence, that is, the incident radiation power is distributed over a larger surface, and/or the scan speed during the annealing sequence is larger than during the layering sequence. The skilled person will readily appreciate that this embodiment saves process time, and in turn saves cost.

In a further aspect, locally melting the powder material may comprise moving a projection spot of a beam of radiation over the powder material surface at a first scan speed, and locally heating up at least a part of the solid body may comprise moving a projection spot of a beam of radiation over a surface of the immediately beforehand manufactured solid layer at a second scan speed, wherein the second scan speed is larger than the first scan speed.

In certain embodiments of the method, it may comprise controlling the heat input per unit area during the annealing sequence such as to heat the part of the solid body to a first temperature range and maintain the temperature within said first temperature range for a dwell time. Controlling the heat input per unit area may comprise controlling the incident radiation intensity and/or the scan speed. It is understood in this respect that this control step may comprise repetitive laser scans of one location within a certain period of time. The power input to the component may be controlled in varying the intensity and the exposure time, and may also be considered a mean power input during a sequence of repetitive exposures of a location to the beam. In more particular instances, the method comprises selecting the first temperature range such that the lower boundary value of the first temperature range is higher than a threshold temperature for gamma prime phase precipitation and the upper boundary value of the first temperature range is lower than the melting point of the resolidified material. Further, the heat input may be controlled such as to achieve a temperature gradient which is sufficiently high to reach the first temperature range before the precipitation of a gamma prime phase sets in. By virtue of this specific embodiment it is avoided to initiate a gamma prime precipitation during a heating up step. As the skilled person will readily appreciate, when the gamma prime precipitation takes place at constant temperature and/or during a cooling down phase, the mismatch of the volume change of the gamma prime phase and other metallic phases in the solid body is significantly reduced compared to gamma prime precipitation during a heating up phase. Consequently, the resulting stresses are significantly reduced.

In still other instances of the method it may comprise performing a multitude of subsequent layering sequences and performing an annealing sequence between two consecutive layering sequences. However, it is not necessary that an annealing sequence is performed between each two consecutive layering sequences. The method may thus comprise performing at least two consecutive layering sequences without the intermediate annealing sequence. The method may more specifically comprise performing an annealing sequence subsequent to every $n^{th}$ layering sequence, wherein n≥2. It may also be the case that carrying out an annealing sequence, or a multitude of annealing sequences, is restricted to certain regions of a component to be built, in particular regions where highest stress concentrations and thus a high risk for strain age cracking is expected. In this respect, it may be that along a buildup direction of a component an annealing sequence is not carried out along a first extent of the component to be built, whereas at least one annealing sequence is carried out in other extents of the component. Consequently, the method may comprise performing an annealing sequence only subsequent to at least one layering sequence in which solid layers are formed in specific sections of the component to be built. That is, only in a part of the extent of the component, along a buildup direction one or more annealing sequences is or are performed.

The method may be carried out such that an annealing sequence comprises effecting a local heat input to at least essentially an entire cross-sectional surface of an immediately beforehand manufactured solid layer. Cross-sectional, in this respect, refers to a cross section of the component to be built across a buildup direction. In other embodiments, the method may be carried out such that an annealing sequence comprises effecting a local heat input to only selected partial areas of a cross-sectional surface of the immediately beforehand manufactured solid layer. Again, areas of the cross section may be selected for in situ annealing where maximum stress concentrations and thus a high risk for strain age cracking is expected.

It is generally noted that if the in situ annealing which is carried out during the annealing sequence is restricted to certain regions of the component to be built, considerably process time and consequently costs may be saved.

It is understood that the features and embodiments disclosed above may be combined with each other. It will further be appreciated that further embodiments are conceivable within the scope of the present disclosure and the claimed subject matter which are obvious and apparent to the skilled person.

BRIEF DESCRIPTION OF THE DRAWINGS

The subject matter of the present disclosure is now to be explained in more detail by means of selected exemplary embodiments shown in the accompanying drawings. The figures show FIG. 1 a Time Temperature Transformation diagram for gamma prime formation of exemplary alloys, and the course of temperature for exemplary annealing methods.

It is understood that the drawings are highly schematic, and details not required for instruction purposes may have been omitted for the ease of understanding and depiction. It is further understood that the drawings show only selected, illustrative embodiments, and embodiments not shown may still be well within the scope of the herein disclosed and/or claimed subject matter.

EXEMPLARY MODES OF CARRYING OUT THE TEACHING OF THE PRESENT DISCLOSURE

Figure 1:
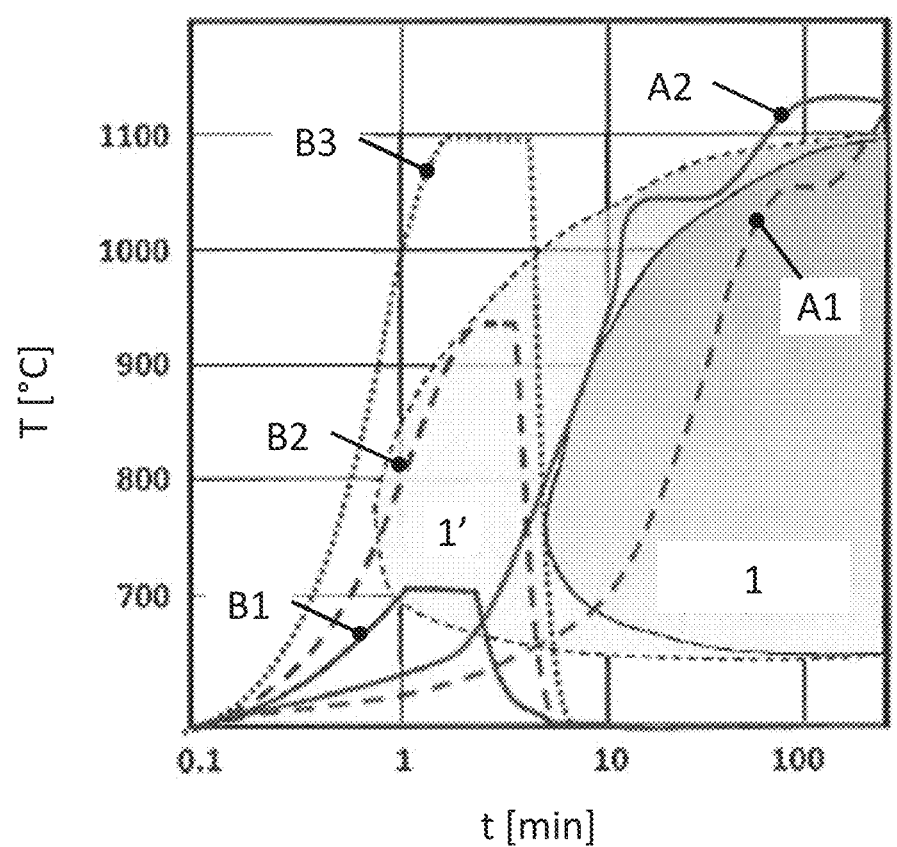

FIG. 1 depicts a schematic Time Temperature Transformation diagram (TTT diagram) for two gamma prime forming alloys, for example nickel base alloys with aluminum or titanium as alloying elements, or cobalt base superalloys. It is understood that these diagrams are to be understood as merely qualitative illustrations. On the vertical axis, the temperature T in centigrade is plotted versus the time tin minutes on the horizontal axis. The shaded area 1 represents the gamma prime precipitating domain of a first alloy. Gamma prime precipitation starts when a graph representing the course of temperature over time of a component made of said alloy is located within shaded area 1. It will be appreciated that the more gamma prime is formed the longer the dwell time of the component in shaded area 1 is. The shaded area at 1' represents a gamma prime precipitating domain of another alloy which contains more gamma prime forming elements, such as aluminum and titanium. It is obvious that for this alloy gamma prime precipitation starts at a certain temperature after a shorter time. Graphs A1 and A2 depict exemplary courses of temperature over time of a component which is heated in a furnace according to prior art annealing methods. If the temperature of a component follows the graph at A1, the component remains in gamma prime precipitating domain 1 for a significant duration, and gamma prime precipitates while the component is heated up. Due to the lattice transformation it is observed that the volume of the component may shrink while the component is heated up. This paradox is due to the fact that the gamma prime phase commonly has a smaller lattice parameter than the gamma or γ phase from which it precipitates. Now, while the component is heated up, gamma prime precipitates, which leads to a volume decrease of the lattices which transform to gamma prime, while at the same time neighboring lattices which do not transform into gamma prime expand due to thermal expansion. At the same time, the ductility of the material which transforms to gamma prime is significantly reduced, which may be up to two orders of magnitude. Moreover, due to the temperature gradients between the surface and the center of the component when heating it up in a furnace, gamma prime does not precipitate uniformly in the entire component. This may result in significant stress levels in the component, which add to stresses which are caused by the manufacturing method as lined out above, and the stresses which are caused by the temperature gradient in the component. In turn, the risk of strain age cracking is enhanced which may result in significant scrap rates of the component. The graph of A2 illustrates an optimized strategy of heating up a component in a furnace, as is disclosed in EP 2 815 841. As is readily appreciated, the course of temperature is outside the gamma prime precipitating domain 1 of one of the exemplary alloys. However, it is far inside the gamma prime precipitating domain 1' of the exemplary alloy with a larger amount of gamma prime forming alloying elements. Due to the thermal inertia of the component and the furnace, the temperature gradient of the component cannot be arbitrarily increased. Further, the faster the component is heated up the larger the resulting temperature gradient inside the component will be, which adds additional stress components. In applying the method according to the teaching of the present disclosure, not the entire component needs to be heated up, but only small areas close to the surface of and in the intermediately formed solid body. Moreover, the heat input into the component is merely effected by radiation. This allows for much steeper local temperature gradients. Exemplary courses of the temperature over time of certain locations which are in situ annealed during the manufacturing of a component according to the herein disclosed method are shown in graphs B1, B2 and B3. The laser repetitively scans a certain surface area, and heats it up. After a desired temperature is a reached, the mean power input from the laser may be reduced to maintain the temperature within a certain range. When following the course of temperature of B1, gamma prime precipitates at a low temperature. When following the course of temperature at B2, the volume to be annealed is heated up to a significantly higher temperature. Some gamma prime precipitates at constant temperature, while also a significant amount of gamma prime is formed at decreasing temperature. Due to the higher plateau value, also the residual stresses which are caused by applying the layerwise additive manufacturing method are significantly relaxed. When following the graph B3, the material is heated up to just below the melting temperature. Thus, relaxation of residual stresses from manufacturing is strongly supported. Some gamma prime precipitates when the volume cools down.

As is visible from the graphs B1, B2 and B3. a volume of the component to be in situ annealed is heated up to a temperature which is between a threshold level for gamma prime precipitation and the melting temperature. The plateau value of the temperature to be reached is larger than the threshold temperature for gamma prime precipitation and lower than the melting temperature. As only a small volume of the component needs to be heated up, and the heat transfer occurs by radiation, much steeper temperature gradients can be achieved than when annealing the entire component in a furnace. It can thus, at least to a large extent, be avoided to initiate a gamma prime precipitation while the material is heated up. Gamma prime precipitation only is initiated while the material is cooling down, and/or when at least part of the stresses caused by manufacturing are relaxed due to the annealing. The dwell time in the gamma prime forming domain is significantly shorter than when annealing in a furnace. It was empirically observed that, when a component was manufactured according to the teaching of the present disclosure, the anomaly of the component shrinking during the first post-manufacturing heating up process does not occur and the vulnerability to strain age cracking is significantly reduced.

Figure 2:
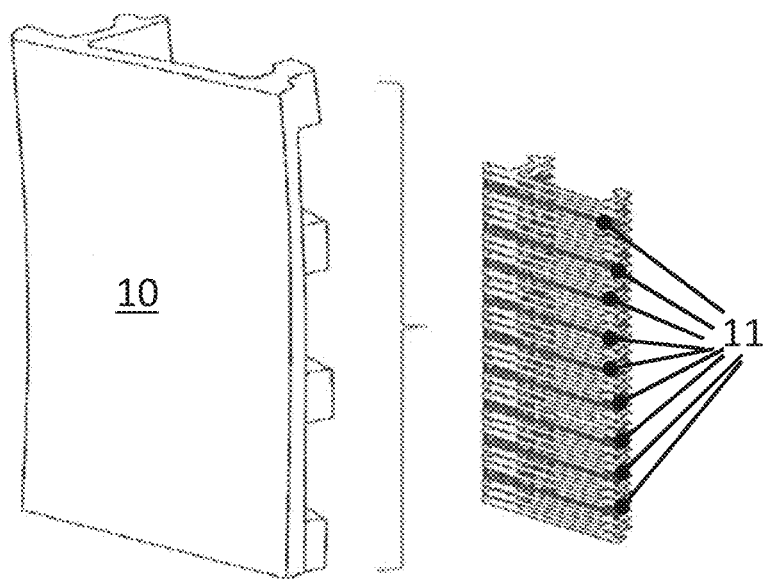
FIG. 2 a mechanical component which is manufactured according to a first embodiment of the herein disclosed method.

FIG. 2 shows an exemplary embodiment of a component 10 which has been manufactured according to the herein disclosed method. The illustration on the right-hand side illustrates the solid layers which were formed during each layering sequence. Each solid layer forms a cross section of the component. Only selected solid layers, for a non-limiting instance in a periodic pattern, denoted in a darker color at 11, were subjected to in-situ annealing.

Figure 3:
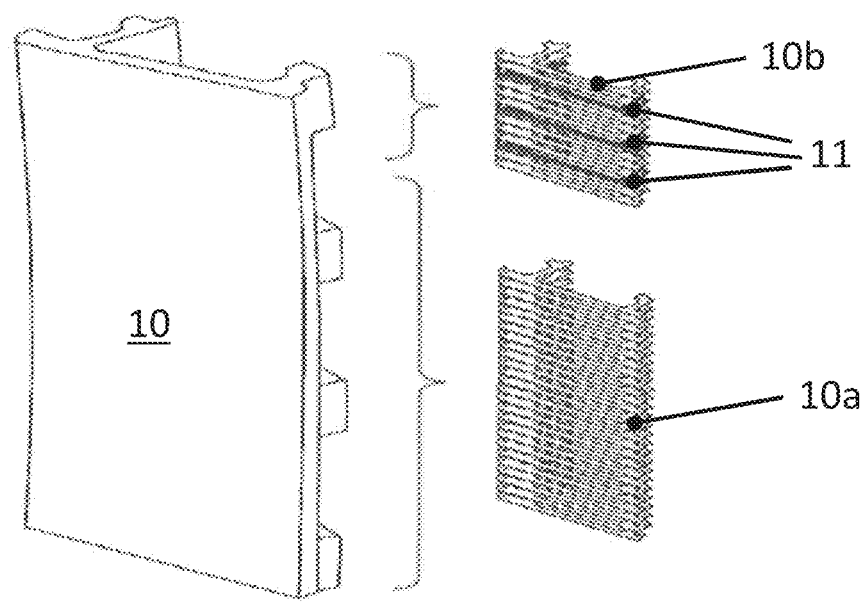
FIG. 3 a mechanical component which is manufactured according to a second embodiment of the herein disclosed method.

In component 10, FIG. 3, no annealing sequences were conducted to all layers of a first section 10a of the whole component 10. In a second section 10b along the buildup direction of component 10 periodic annealing sequences were performed after the layering sequences in which layers 11, shown in darker color, were formed.

Figure 4:
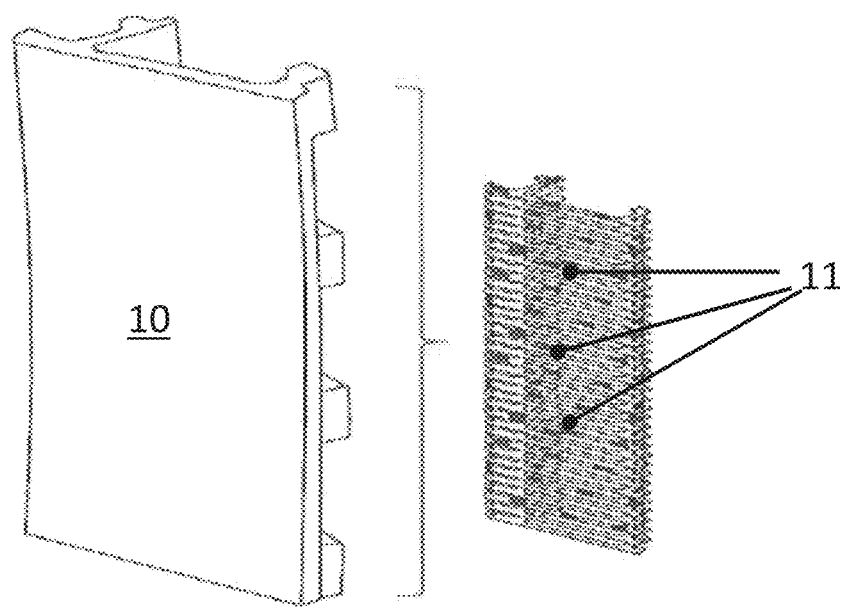
FIG. 4 a mechanical component which is manufactured according to a third embodiment of the herein disclosed method.

In the embodiment shown in FIG. 4, only selected areas of the whole component 10, depicted in a darker color, were subjected to in situ annealing. Some of those sections are denoted by 11. That is to say, when an annealing sequence was initiated after a layering sequence, a local heat input was only performed to selected partial areas of a cross-sectional surface of the immediately beforehand manufactured solid layer.

Figure 5:
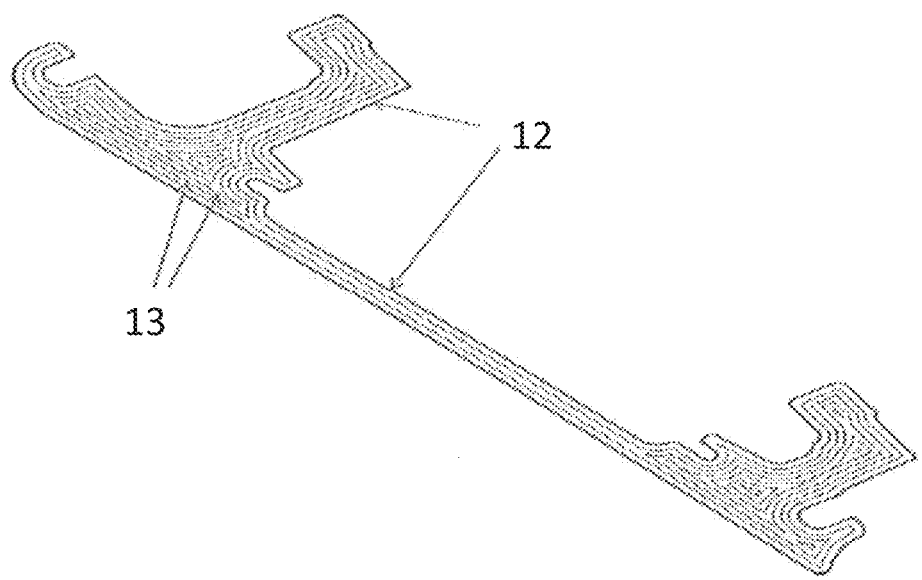
FIG. 5 a first exemplary embodiment of scanning a component cross section during an annealing sequence.
Figure 6:
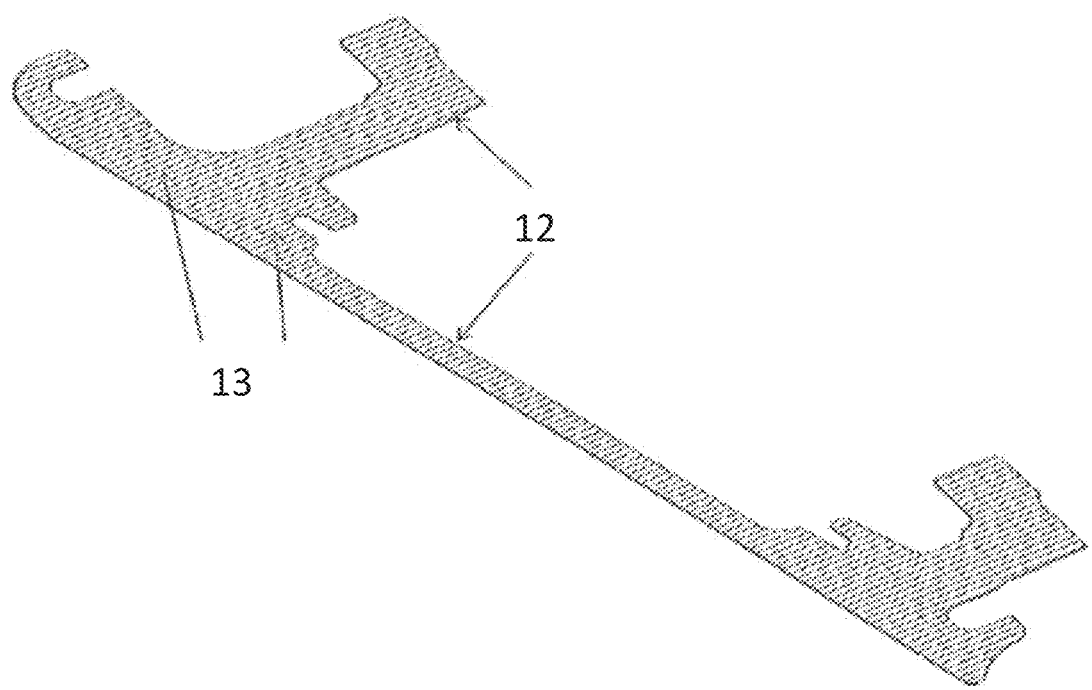
FIG. 6 a second exemplary embodiment of scanning a component cross section during an annealing sequence.

FIG. 5 depicts a cross section 12 of a component 10 of any of FIGS. 2 through 4. 13 denotes the scan traces for the annealing sequence. The scan traces are parallel and at an offset distance of 0.2 to 1.0 mm from the outer contour of the component. The scan traces have a defined hatch distance. In particular embodiments, the hatch distance may be much higher than during the SLM processing and may also be larger than the diameter of the defocused laser beam. For instance, the hatch distance may correspond to 1 to 2 times the defocused laser diameter which is projected onto the surface, and the offset distances to the outer contour may be chosen larger than 0.3 mm. With these parameters, excessive heat input into thin-walled structures can be avoided. Thin wall sections, with a wall thickness of less than 1 mm, will only be subjected to one or two laser passes, and very thin regions with less than 0.5 mm wall thickness will automatically be excluded from the treatment. Despite the limited heat dissipation capability of thin walls, overheating can thus be avoided. In this respect it is generally understood that heating and melting is delayed due to heat transfer to neighbouring volumes if a surface area of a solid body is exposed to local heat input. This is not the case when the wall thickness is below a certain dimension.

With the scanning parameters described above the risk of melting the material may be avoided even without this heat dissipation capability.

In the embodiment of FIG. 5 unidirectional or bidirectional linear hatch scans 13 are applied in a cross-section. A distance of 0.2-1.0 mm from the outer contour of the cross section may be chosen in order to avoid overheating of the component surface and/or in order to avoid undesired coagulation of powder particles in the surface zone. It is again understood that in certain embodiments the hatch distance may be much higher than during the layering sequence and that it may be larger than the diameter of the defocused laser beam.

While the subject matter of the disclosure has been explained by means of exemplary embodiments, it is understood that these are in no way intended to limit the scope of the claimed invention. It will be appreciated that the claims cover embodiments not explicitly shown or disclosed herein, and embodiments deviating from those disclosed in the exemplary modes of carrying out the teaching of the present disclosure will still be covered by the claims.

LIST OF REFERENCE NUMERALS 1 gamma prime (y') precipitating domain
1' gamma prime (y') precipitating domain
10 component
11 in situ annealed regions of the component
12 cross section of the component
13 scan trace
A1 temperature-time graph
A2 temperature-time graph
B1 temperature-time graph
B2 temperature-time graph
B3 temperature-time graph

The invention claimed is:

1. A method for manufacturing a mechanical component, the method comprising:
  additively manufacturing at least one layering sequence of depositing a powder material and locally melting and resolidifying the powder material, wherein in each layering sequence a solid layer of solidified material is formed, wherein plural solid layers jointly form a solid body;
  executing an annealing sequence subsequent to at least one layering sequence, the annealing sequence including locally heating at least a region of the solid body in effecting a local heat input to an immediately beforehand manufactured solid layer which was formed by an immediately precedent layering sequence, wherein a material temperature during the annealing sequence is maintained below a melting temperature of the material;
  controlling a heat input per unit area during the annealing sequence such as to heat part of the solid body to a first temperature range and maintain temperature within said first temperature range for a dwell time; and
  selecting the first temperature range such that a lower boundary value of the first temperature range is higher than a threshold temperature for gamma prime phase precipitation, and an upper boundary value of the first temperature range is lower than a melting point of the resolidified material.

2. The method according to claim 1, wherein locally melting the powder material comprises:
exposing the powder material to radiation at a first incident radiation intensity and providing a first incident radiation energy per unit area; and locally heating at least a part of the solid body comprises:
exposing the immediately beforehand manufactured solid layer to radiation at a second incident radiation intensity and providing a second incident radiation energy per unit area.

3. The method according to claim 2, wherein the second incident radiation intensity is smaller than the first incident radiation intensity by at least one order of magnitude.

4. The method according to claim 2, wherein the second incident energy provided per unit area is smaller than the first incident energy provided per unit area.

5. The method according to claim 2, wherein locally melting the powder material comprises:
projecting a beam of radiation of a first radiation power onto a first projection surface on the powder material; and locally heating at least a part of the solid body comprises:
projecting a beam of radiation of a second power onto a second projection surface on the immediately beforehand manufactured solid layer, wherein the second projection surface is larger than the first projection surface.

6. The method according to claim 2, wherein locally melting the powder material comprises:
moving a projection location of a beam of radiation over the powder material surface at a first scan speed: and locally heating at least a part of the solid body comprises:
moving a projection location of a beam of radiation over a surface of the immediately beforehand manufactured solid layer at a second scan speed, wherein the second scan speed is larger than the first scan speed.

7. The method according to claim 1, comprising:
controlling heat input to achieve a temperature gradient to reach the first temperature range before the precipitation of a gamma prime phase sets in.

8. The method according to claim 1, comprising:
performing a multitude of subsequent layering sequences, and performing an annealing sequence between two consecutive layering sequences.

9. The method according to claim 8, comprising:
performing at least two consecutive layering sequences without an intermediate annealing sequence.

10. The method according to claim 9, comprising:
performing an annealing sequence subsequent to every $n^{th}$ layering sequence, wherein n>2.

11. The method according to claim 8, comprising:
performing an annealing sequence subsequent to at least one layering sequence in which solid layers are formed only in specific regions of the component to be built.

12. The method according to claim 1, wherein an annealing sequence comprises:
effecting a local heat input to at least essentially an entire cross sectional surface of the preceding manufactured solid layer.

13. The method according to claim 1, wherein an annealing sequence comprises:
effecting a local heat input to only selected partial areas of a cross sectional surface of the preceding manufactured solid layer.

* * * * *